United States Patent [19]

Safford

[11] 4,332,977
[45] Jun. 1, 1982

[54] TELETYPEWRITER PRIVACY SYSTEM

[75] Inventor: Laurance F. Safford, Washington, D.C.

[73] Assignee: American Standard Inc., New York, N.Y.

[21] Appl. No.: 201,985

[22] Filed: Jun. 12, 1962

[51] Int. Cl.³ .............................................. H04L 9/02
[52] U.S. Cl. ................................ 178/22.14; 178/22.13
[58] Field of Search ................... 178/29, 22, 31, 33 R, 178/22.01, 22.02, 22.03, 22.12, 22.13, 22.14, 22.15

[56] References Cited

PUBLICATIONS

*University of Michigan Technical Report No. 90,* "Introduction to Linear Shift-Register Generator Sequences", Oct. 1958, Birdsall and Ristenbatt.
*MIT Lincoln Lab, Technical Report No. 95,* dated Sep. 12, 1955, "Several Binary Sequence Generators", Zierler.
*MIT Lincoln Lab Group Report 34-24,* Jul. 1954, "Two Pseudo-Random Sequence Generators", Zierler.
*MIT Lincoln Lab, Group Report No. 34-63,* "Linear Recursive Sequences I", Dec. 1957, and Linear Recurring Sequences, Aug. 1958, Zierler.

*Primary Examiner*—Howard A. Birmiel
*Attorney, Agent, or Firm*—Robert G. Crooks; John P. Sinnott; James J. Salerno, Jr.

EXEMPLARY CLAIM

1. A teletypewriter privacy system comprising a first and a second pair of terminals responsive to printing-telegraphy signals having start bauds; means for generating program signals having a fixed timing relationship with the start bauds of said telegraphy signals; a mixer circuit coupled between said terminals, and responsive to said program signals; said mixer circuit including a first switch coupled to said first pair of terminals, and a second switch coupled to said second pair of terminals, means responsive to a start baud at said first pair of terminals for maintaining said first switch operative to couple said first pair of terminals to said mixer circuit for one telegraph character, means responsive to a start baud at said second pair of terminals for maintaining said second switch operative to couple said second pair of terminals to said mixer circuit for one telegraphy character, first polarized switch means responsive to the telegraphy signal at the first pair of terminals and the program signal for selectively activating said second switch, and second polarized switch means responsive to the telegraphy bauds at the second pair of terminals and the program signal for selectively activating said first switch. 19. In combination, an electrical switching circuit for generating four pseudo-random binary electrical signals that correspond to W, X, Y and Z, and another electrical circuit for combining, through logical OR gates, said electrical signals to generate a further electrical signal representing WXYZ+XY+Z W, for use as a key for encoding a communication signal.

21 Claims, 3 Drawing Figures

TELETYPEWRITER PRIVACY SYSTEM

The present invention relates generally to privacy telegraphy systems and more particularly to a privacy system utilizing modern techniques and hardware and particularly designed for low security, e.g. commercial use.

For commercial privacy use, a machine known as "TELEKRYPTON" has been widely used. This system has performed admirably for a number of years but has certain disadvantages relative to size, cost, complexity and portability. Telekrypton uses a cryptographic program generated by a paper tape which completely obviates the possibility of system portability. Also, the tape causes serious problems, with regard to the amount, temperature, and humidity of storage areas.

In the present invention, the tape is replaced by an electronic program generator. The program generator includes a pair of magnetic core feed back shift registers, each having multiple feedback connection combinations between inputs and outputs of selected cores in a shift register via a simple linear mixer.

Outputs from the last stage and a selected stage of each shift register are applied to a non-linear output mixer which derives the program signal. The mixer requires minimum hardware, only three magnetic cores and a diode OR circuit. Yet its inputs are combined in accordance with a unique and difficult to decode function, $F = W\overline{X}\overline{Y}\overline{Z} + X\overline{Y} + Z\overline{W}$. This non-linear function has equal numbers of binary zeros and ones in response to the different input combinations. By utilizing electronic and magnetic core components in the program generator, the present invention avoids the undesirable features of the paper tape of Telekrypton.

The "Telekrypton" is complex since it uses multiplex equipment to time share one signal relay coil. The relay coil is connected in a three terminal delta network so that current flows in either direction through it dependent on the program signal and the input baud.

In the present system, the multiplex equipment is eliminated. Instead, a pair of signal relays, one each at the system local loop and line input terminals, are actuated by separate deltas. During the entire application of a character to one set of input terminals, the signal relay coupled to that terminal is locked in place to insure that the entire character is coupled to the network. This is accomplished with a trigger relay actuated in response to a start baud in each character. Trigger relay actuation results in the energization of a reversing relay and an operate relay. Activation of the reversing relay applies a signal to lock the appropriate signal relay. The operating relay is energized to apply a control signal to maintain the signal relay in the locked condition only during the particular character.

During the start and space bauds in each character, a line repeater relay or teletype repeater relay, depending on transmission direction, is activated into a first state. In this state, the lead carrying the program is always connected to one input terminal of the delta. During start and stop bauds, the program is always of the required value to properly energize the coil in the delta so that the baud goes through unaltered. During intelligence bauds, the program randomly changes value to couple and decouple the output terminals to the circuit under the influence of the delta. When a mark baud is received, the repeater relay is energized to a second state so that the cryptographic program circuit is connected to the other delta input terminal. The occurrence of different valued signals in the program now has the opposite effect from that existing during the occurrence of space bauds. A predetermined time period after the start baud is applied to the system, a reset voltage is applied to remove the control signal from the program control relay so either pair of input terminals can control the circuit in response to the next start pulse.

By use of this network comprising eight polarized relays, complexity of equipment is greatly reduced over that in the Telekrypton system which employed 14 relays for accomplishing the same result.

An additional feature of the present invention is the use of a capacitor shunting the previously mentioned trigger relays so that the system in not erroneously activated by spurious line or local loop occurrences, such as transients or momentary interruptions.

A further feature is the inclusion of a manually operated program advance or retard mechanism. This device may be activated during message reception when the operator notices that the readout is gibberish. It represents a great improvement over the TELEKRYPTON in which the entire system must be shut down to advance or retard the paper tape.

In the system of the present invention, plain text is selectively transmitted through the system only when a spring loaded switch is held down manually. The constant value timing signals which activate the program generator or the varying value cryptographic key signal are selectively coupled by a single manually operated switch to the mixer. Both aural and visual indications of system operation in plain language mode are utilized for fool-proofness.

While the present system has primary use for commercial purposes, it may be used for military purposes by merely changing the single module containing the output mixer.

It is accordingly an object of the invention to provide a new and improved teletypewriter privacy system.

Another object of the present invention is to provide a new and improved teletypewriter privacy system which utilizes modern electronic components, such as magnetic cores and transistorized circuits.

A further object is to provide a teletypewriter privacy system which incorporates a self-contained program generator in place of the perforated tape previously utilized in earlier apparatus.

It is another object of the present invention to provide a teletypewriter privacy system which system is portable and rugged enough for military field utilization.

An additional object is to provide a commercial teletypewriter privacy system which may be converted into a low grade military system by the replacement of a single minor unit.

The above and still further objects, features and advantages of the present invention will become apparent upon consideration of the following detailed description of one specific embodiment thereof, especially when taken in conjunction with the accompanying drawings, wherein:

FIG. 1 of the drawings is a system block diagram in which the present invention is utilized;

Figure 1:
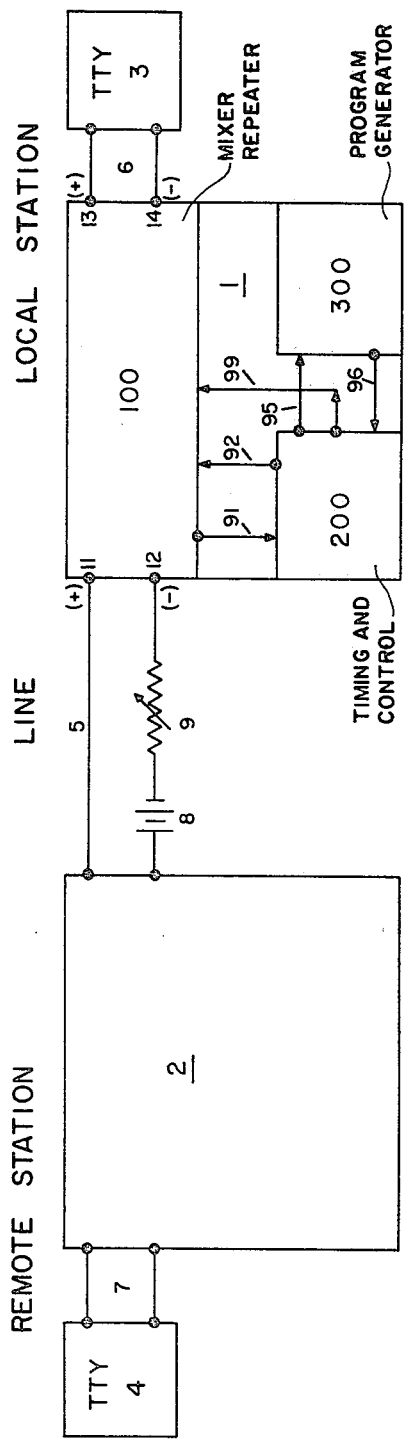

FIG. 1 of the drawings illustrates the block diagram connections of two units 1 and 2, embodying the present invention, in a secure half-duplex teletype circuit which permits keyboard to keyboard operation of their associated teletypewriters 3 and 4, respectively. The units 1 and 2 are represented as four terminal networks with line terminals 11 and 12 connected to the telegraph line 5 and teletypewriter terminals 13 and 14 connected to the local loops 6 and 7, respectively. The essential circuit elements of the teletypewriter equipments 3 and 4 are a standard power supply, current limiting resistors, selector magnets, key contacts and timing cams, all of which are well known and not shown. The two wire line 5 includes a suitable line battery 8 connected in series with a current limiting resistor 9 designed to permit circulation of a current of 60 or 20 milliamperes, as required.

The transmitting teletypewriter 3 or 4 prints hard copy of the original message while the line 5 transmits unintelligible gibberish in 7.42 baudot code on a start-stop basis. The receiving teletypewriter prints a perfect replica of the original hard copy, subject to errors due to transients on a long line telegraph circuit, and noise or fading on radio telegraph circuits. Each of the units 1 and 2 introduces a time delay of about ½ baud length so the receiving teletypewriter lags the transmitting teletypewriter by approximately one baud, which delay is generally less than that introduced by the telegraph line 5. When utilizing the units 1 and 2 of the present invention no circuit changes are required in the teletypewriters 3 and 4.

Each of the units 1 and 2 is identical so that the components in unit 1 only need description. Unit 1 includes a mixer repeater 100 having its terminals 11 and 12 connected to line 5 and its terminals 13 and 14 connected to local loop 6 and teletypewriter 3. A timing and control unit, TIMCON, 200 is interconnected with mixer repeater 100 by circuits 91, 92 and 99 and is connected to a program generator, PROGEN, 300 by means of circuits 95 and 96.

When a start, i.e. space, baud is applied to the mixer repeater 100 from either the telegraph line 5 or the local loop 6, control voltage circuit 91 is energized from the mixer repeater by a regulated D.C. voltage of appropriate polarity and amplitude. Energizing the control voltage circuit 91 results in the timing and control circuit 200 generating timing pulses at a selected rate of 46, 50½, 57½ or 75 pulses per second, corresponding to 60, 66, 75 and 100 words per minute. The rate at which the pulses are generated is controlled manually by the setting of a control selector switch or potentiometer in TIMCON 200. After seven timing pulses have been generated, the reset pulse circuit 92 is momentarily energized from TIMCON 200 so that the control circuit 91 is de-energized by mixer repeater 100. The generation of seven timing pulses sequentially by TIMCON 200 completes the operating cycle for a character, including start, intelligence, and stop bauds.

The timing and control unit 200 counts out and distributes the timing pulses in addition to generating and shaping them. Timing pulses which correspond to the first, second, third, fourth and fifth intelligence bauds of the character are applied to the program generator 300 by way of timing circuit 95 and corresponding program pulses are received back at TIMCON 200 from PROGEN 300. In response to the program pulses, TIMCON 200 generates analog voltages of fixed negative or positive D.C. amplitudes, dependent upon the program signal received on circuit 96. These positive and negative voltages are applied to the mixer repeater 100 from TIMCON 200 via circuit 99 and are mixed with the gibberish or intelligence signals applied either from line circuit 5 or local loop 6. For the start and stop bauds of the character received by mixer repeater 100, TIMCON 200 always applies signals of the same polarity, positive in the equipment designed, to the mixer repeater via circuit 99 so that no change in the start and stop baud as transmitted and received through unit 1 is effected.

PROGEN 300 is enslaved to TIMCON 200 in its timing and operation. PROGEN 300 receives timing pulses from TIMCON 200 via circuit 95 and reads out on demand a very long program sequence of binary ones and zeros. These binary ones and zeros, indicated by very short pulses of fixed positive value or zero value, respectively, are transmitted from PROGEN 300 to TIMCON 200 via program pulse circuit 96.

Successive increments of the program as derived from PROGEN 300 are applied to mixer repeater 100 via TIMCON 200 and circuit 99 where they are mixed or combined with the intelligence bauds of the incoming signal which is applied to terminals 11 and 12 or 13 and 14. Corresponding bauds of the outgoing signal are transmitted through the opposite terminals from which the intelligence signal is received, depending upon the direction of transmission. In the present description and claims the term "intelligence" is utilized for both the plain language signal applied to terminals 13 and 14 from local loop 6 or the gibberish signal applied to terminals 11 and 12 from telegraph line 5, i.e. intelligence signal always denotes incoming signal to the unit.

The first or start, and last or stop, baud of a teletype character are always mixed with a spacing signal from TIMCON 200 and are never reversed in polarity as they pass over the telegraph line 5 or through the local teletype loop 6. The other five or intelligence bauds of the character are reversed in polarity on a random basis, depending upon the program signal derived from PROGEN 300. The mixing operation in mixer repeater 100 is in accordance with the standard and well known modulo two or half adder form, i.e. if the intelligence signal is of the same polarity as the signal in circuit 99, the output is a binary zero, while an intelligence signal of opposite polarity than that signal in circuit 99, causes a binary one output to be generated. Because of the linear nature of this mixing operation, it is immaterial whether line 5 is connected to terminals 11 and 12 or to terminals 13 and 14 and vice versa with respect to local loop 6. However, the polarities of both pairs of terminals 11/12 and 13/14 must be correctly observed so that reversal in polarity is not effected by transmission through the mixer repeater.

As indicated above, the unit 2 is identical to the unit 1 and its PROGEN 300 is coded in exactly the same manner as the PROGEN 300 in FIG. 1. Thereby, the internal signal applied to mixer repeater 100 of unit 2 via circuit 99 is always exactly the same as the signal applied to mixer repeater 100 in unit 1 for corresponding signals applied thereto. Thus if it is assumed that teletypewriter 3 is transmitting and teletypewriter 4 is receiving, a plain language signal is applied via local loop 6 and a ciphered or gibberish message is transmitted between the transmitting station and the receiving station via line 5. The gibberish received at the remote station unit 2 is deciphered and applied as plain language to teletypewriter 4 via local loop 7. This is accomplished since the TIMCONS 200 of units 2 and 3 are in signal synchronism to cause the receiving mixer to decode the received signal as a faithful replica of the transmitted signal.

Figure 2:
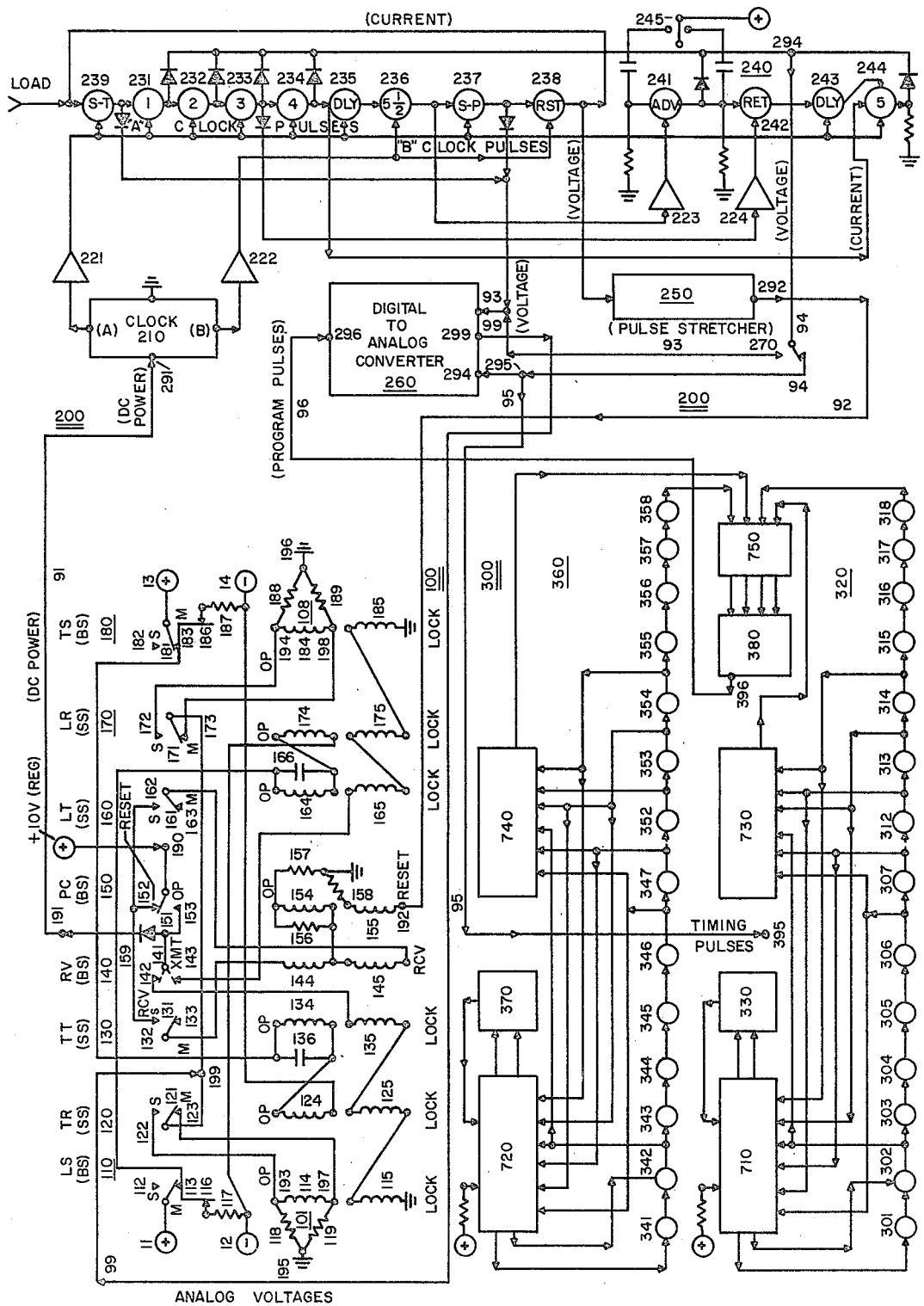
FIG. 2 is a schematic diagram of the present invention.

Reference is now made to FIG. 2 of the drawings which discloses in schematic form the equipment denoted by either of units 1 and 2 in FIG. 1. Mixer-repeater 100 includes eight polarized relays 110, 120, 130, 140, 150, 160, 170 and 180. Throughout the relay description, the associated contacts and coils of each relay have the same hundreds and ten digits as the relay with which they are associated. Each of these relays is shown in its normal "rest" condition so that relays 110, 140, 150, and 180 are shown in their unenergized state while the remaining relays 120, 130, 160 and 170 are illustrated in the drawing as in their energized state. The armature 111 of line signal relay 110 is connected to the positive terminal 11 of line 5 and is normally maintained in engagement with contact 113. For normal 60 ma line current, switch 116 is closed and 40 ma current is shorted through resistor 117 to the negative line terminal 12: 20 ma current goes through the parallel circuit, including coils 164 and 174 of line trigger relay 160 and line repeater relay 170, respectively. For 20 ma line current, switch 116 is opened. Capacitor 166 is connected in parallel with coil 164 to give a delayed release and thus prevent false triggering of relay 160.

A similar but complementary circuit to that connected between line terminals 11 and 12 is connected between the positive and negative terminals 13 and 14 of local loop 6 and comprises armature 181 and contact 183 of teletypewriter signal relay 180. For 60 ma loop current switch 186 is closed and 40 ma of current flows through in series with resistor 187, between contact 183 and negative loop terminal 14. A parallel circuit including relay coils 134 and 124 of teletypewriter trigger relay 130 and teletypewriter repeater relay 120 respectively is connected between contacts 183 and terminal 14. Capacitor 136 is connected in parallel with coil 134 for the same purpose as discussed supra in connection with capacitor 166 and coil 164.

Upon a cessation of current applied to terminals 11 and 12 from line 5, an indication of a start or space signal, relays 160 and 170 are de-energized and their armatures 161 and 171 are positioned against contacts 162 and 172, respectively. When armature 161 alights on contact 162, a positive voltage is applied to coils 145 and 154 of bi-stable reversing relay 140 and bi-stable pulse control relay 150, respectively, by way of terminal 190, armature 151, contacts 152 and 162 and armature 161. The circuit from coil 154 is continued to ground via current limiting resistor 157. Resistor 156 is connected in parallel with coil 154 to delay the operation of coil 154 a few milliseconds subsequent to the activation of coil 145 to insure complete activation of the latter. Activation of coils 145 and 154 results in armatures 141 and 151 engaging contacts 142 and 153, respectively. Armature 141 remains engaged against contact 142 upon the cessation of current in coil 145; its armature 141 is not moved to contact 143 until coil 144 is energized. With armatures 151 and 141 engaging contacts 142 and 153, a positive voltage is applied from terminal 190 to coils 115, 125, and 135 all of which are connected in series with contact 142. Coils 115, 125 and 135, when energized, serve as locking coils for relays 110, 120 and 130, respectively to maintain armatures 111, 121, and 131 engaged against contacts 113, 123, and 133, respectively. Relays 110, 120 and 130 remain locked during the five intelligence bauds of a character and are not released until the stop baud is received as will be seen from the description infra.

When signal transmission is in the opposite direction so that a start or space signal is applied to terminals 13 and 14 from local loop 6 resulting in the termination of current in coils 124 and 134, coils 165, 175 and 185 are energized to lock armatures 161, 171 and 181 against contacts 163, 173 and 183, respectively. Series connected coils 165, 175 and 185 are energized by the circuit established through contact 143 and armature 141 by its connection to contact 153 and the voltage applied at terminal 190 to armature 151. With a cessation of current to terminals 13 and 14, coil 134 is de-energized so that armature 131 engages contact 132 to energize coils 144 and 154. Energization of coil 144 results in the establishment of the previously described circuit wherein armature 141 engages contact 143.

When sufficient time has elapsed from the occurrence of a start baud for a stop baud to be received, a pulse is applied to coil 155 via terminal 192, circuit 92 and current limiting resistor 158. This pulse resets the armature of relay 151 to engage contact 152. This removes the voltage which was applied to the locking coils and the relays are permitted to be activated in response to the next received start baud. Upon the reception of each start or space baud by terminals 11 and 12, relay coil 174 is de-energized so that armature 171 moves out of engagement with contact 173 and into engagement with contact 172.

Contacts 172 and 173 are connected to input terminals 194 and 198, respectively of a three terminal current dividing network 108. The third terminal 196 of network 108 is connected to a common point or ground and to terminals 194 and 198 by way of balancing resistors 188 and 189. Connected between terminals 194 and 198 is operating coil 184. Either positive or negative voltages are applied to both terminals 194 and 198 by way of armature 171, terminal 199, and circuit 99 which feeds terminal 199 with positive or negative program voltages of fixed amplitude.

The signal at terminal 199 is positive or negative depending upon the output of PROGEN 300. For start and stop pulses, the signal at terminal 199 is always positive but it varies in a random basis, depending upon the program established in the PROGEN 300, for the five character bauds between the start and stop bauds.

In response to mark signals at terminals 11 and 12, relay coil 174 is energized so that armature 171 engages contact 173. If, when a mark is applied to terminals 11 and 12, a binary one is programmed, a positive voltage is applied to terminals 197 and 198 and the current from this voltage divides between the two parallel branch circuits, one branch circuit consisting of resistor 189 and the other branch circuit consisting of series connected coil 184 and resistor 188. The flow of positive current through coil 184 from the terminal 198 results in armature 181 of relay 180 being engaged against contact 183. If the current applied to terminal 198 is negative, coil 184 produces a flux to urge armature 181 into engagement with contact 182. This open circuits the path between terminals 13 and 14 so that a space signal is transmitted in the local loop 6. When a space or start baud is applied to terminals 11 and 12, relay coil 174 is de-energized causing armature 171 to engage contact 172.

When a start or space baud is applied to terminals 11, and 12, a positive voltage is applied to terminal 199 and hence is applied to terminal 194 by way of armature 171 and contact 172. The positive voltage applied to terminal 194 results in coil 184 being energized to move armature 181 into engagement with contact 182. This results in a start or space signal being applied to the local teletypewriter loop 6. When a space intelligence baud is applied to terminals 11 and 12 the voltage as terminal 199 may be positive or negative depending upon the program status. With a positive voltage at terminal 199 relay 180 is activated in the same manner as it is activated for the start pulses. With a negative voltage applied at terminal 199 and a space at terminals 11 and 12, a negative current is applied through relay coil 184 to maintain armature 181 in engagement with contacts 183. It should thus be seen that if there is polarity coincidence between the signals applied to terminals 11 and 12 and to terminal 199, a space signal is derived at terminals 13 and 14 while if there is polarity dissimilarity between the signals at terminals 11 and 12 and terminal 199 a mark signal is applied between terminals 13 and 14 to local loop 6.

A similar circuit for closing and opening the line signal relay armature in response to signals applied to terminals 13 and 14 comprises armature 121, relay contacts 122 and 123 and "delta" terminals 193 and 197. Three-terminal "delta" network 101 comprises relay coil 114, connected between terminals 193 and 197 and balancing resistors 118 and 119 connected to ground point 195 and input terminals 193 and 197, respectively. Coil 114 is energized to activate relay armature 111 in response to the signals at terminals 13 and 14 and terminal 199 in exactly the same manner as relay coil 184 is energized. Thus, the system operates in the same manner for the signals from the local loop 6 or the telegraph line 5.

To generate the required timing relationship between the various bauds of the signal and the analog voltages on lead 97, timing and control unit 200 and program generator, PROGEN, 300 are provided. The timing and control unit, TIMCON, 200 includes a clock 210 which preferably is in the form of a standard free-running multivibrator having variable resistors for the required different rate pulses. In response to a start pulse, armature 151 engages contact 153 and a positive voltage is applied to energize clock 210 through diode 159, terminal 191 and lead 91. The application of D.C. power to terminal 291 of clock 210 results in the immediate generation of complementary clock pulses at the A and B output terminals of clock 210. The clock pulses derived at terminals A and B of clock 210 are utilized for advancing signals stored in the cores included in circuits 230 and 240.

Ring counter circuit 230 includes a nine stage shift register having cores 231-239. Cores 231-235, 237 and 239 are advanced in response to the A pulses of clock 210 derived from the output of driving amplifier 221 and cores 236 and 238 are driven by the B clock pulses from driving amplifier 222. The output of each of the cores 231-238 is cascaded to the next core, the output of core 238 being returned to the input of core 239, the output of which is applied to the input of core 231. Core 239 is connected to a load terminal so that a binary one is stored therein when system operation is begun. Application of successive pulses from driving amplifier 221 to the cores with which it is connected results in sequential stepping of the loaded binary one in core 239 to cores 231-236.

The outputs of cores 231-234 are coupled through isolating diodes to terminal 294 so that pulses are always produced at terminal 294 at a fixed rate, designed to coincide with the first four intelligence bauds in the received signal. The output of core 234 is applied to the input winding of core 244 which has its inhibit winding connected to the output winding of delay core 243. Normally, core 244 is not inhibited so that an output is derived from it for the fifth intelligence baud in a character. The output of core 244 is applied through an isolating diode to terminal 294 so that under normal operating conditions five sequential pulses appear at terminal 294 at a time coincident with the reception of the five intelligence bauds in the received signal.

To insure maintenance of the exact timing relation between the received signal and the derivation of pulses from cores 231-234 and 244, cores 235-238 are provided. Core 235 is a phantom delay stage which inserts the same delay in the ring counter as would be inserted by core 244 if it was in the ring. Each of cores 236 and 238 introduces a one-half baud delay in the shift register circulation. This is because the B pulses applied thereto are spaced one-half in time between repeated occurrences of the A pulses. Cores 237 and 239 provide delays equal to the stop and start bauds, respectively, of each character.

Correction circuit 240 is utilized for manually controlling the timing and control unit to maintain the program in proper synchronism with a signal received at terminals 11 and 12. If the operator notices that the receiving teletypewriter is producing gibberish, he will from experience know whether the system timing is ahead or behind the ciphered message received at terminals 11 and 12. To provide correction, manual switch 245 is activated from its normal position into engagement with either its left or right contact.

If the system is lagging, the armature of switch 245 is moved into engagement with the left contact and a positive pulse is applied to the input winding of core 241. An output will be derived from core 241 when the next output is generated from core 236 because of the connection between the output of core 236 and the advance winding of core 241 through driving amplifier 223. This results in an output being applied to terminal 294 through an isolating diode from the output winding of core 241 between the fifth and stop pulse in a character.

If the operator knows from experience that the message being read out from the teletypewriter is gibberish because the system is ahead of the signal received, he activates switch 245 so that the armature engages the right hand contact. This results in core 242 having a binary one applied to its input winding. Core 242 is connected to the output winding of core 233 by way of an isolating iode and driver amplifier 224. When core 242 has been loaded and subsequentially receives an advance pulse from the output of amplifier 224, it loads a binary one into delay core 243. When the next A pulse is generated, delay core 243 produces an output pulse that is applied to the inhibit winding of core 244. In consequence, core 244 produces no output pulse subsequent to the next time core 234 produces an output pulse. Thereby, the timing pulse corresponding with the fifth intelligence baud is dropped and the system is retarded one baud.

The voltage output of core 238, occurring at a time coincident with the stop baud in a character, is applied to the input terminal of pulse stretcher 250. Pulse stretcher 250 includes a suitable shaping network for producing a pulse at output terminal 292 to energize reset relay coil 155 to which it is connected via circuit 92 and terminal 192. Energization of reset coil 155 results in armature 151 being returned to contact 152 so the system may await a new character start baud.

To convert the binary pulses from the program generator 300 to positive or negative voltage to be supplied to terminal 199, digital to analog converter 260 is provided. Digital to analog converter 260 produces positive and negative voltages of substantially constant amplitude in response to the program pulses applied thereto on lead 96, the start and stop timing pulses applied to it on lead 93, and the five intelligence timing bauds applied to it at terminal 294. Circuit 93, connected to output terminal 293 of converter 260 is responsive to the output signals of cores 237 and 239 and possibly to the intelligence baud timing signals at terminal 294. The latter condition prevails if switch 270 is activated so its armature contacts the terminal coupled to circuit 93.

When a pulse is applied to terminal 293, converter 260 generates an output pulse at terminal 299 of positive polarity. As will be recalled from the description of mixer repeater 100 it is necessary that the start and stop bauds be received in coincidence with positive voltages at terminal 199. The switch 270 (spring-loaded to the cipher position) is provided so that the system is able to handle "clear" or plain language messages as well as enciphered messages. An indicator, visual and/or aural, is responsive to switch 270 engaging circuit 93 so that the operator knows when the system is operating in the clear text manner. Switch 270 must be held in its "clear" position manually, against the force of the spring. In consequence, under normal operating conditions switch 270 engages its right terminal and circuit 94, so that clear text cannot be transmitted.

Circuit 94 is coupled to input terminal 294 to supply it with timing pulses coincident with the five intelligence bauds in the signal passing through mixer repeater 100. The timing pulses are also applied to control the apparatus and program generator 300 via circuit 95 and terminal 395.

PROGEN 300 includes two strings of eighteen stage shift registers 360 and 320, shift register 320 including eighteen cascaded magnetic cores 301–318, cores 308–311 not being shown while shift register 360 includes cascaded cores 341–358, cores 348–351 not being shown. The timing pulses at terminal 395 are applied via suitable circuitry to the advance windings of each of the cores in shift registers 320 and 360 and to the cores included in mixer circuit 380.

Selected output circuits from cores 301–318 are applied as inputs to feedback selector switch 710 and readout selector switch 730. A pair of inputs applied to selector switch 710 are selected and applied as inputs to transistorized binary half adder or modulo two adder 330. The output of half adder 330 is applied back as one of the inputs to selector switch 710. Selector switch 710 couples the output of mixer 330 to either the input winding of core 301 or the inhibit winding of core 302. Similarly, cores 341 and 342 are connected to mixer 370 via switch 720. The input windings of cores 301 and 341 are selectively coupled to the feed back mixers 330 and 370 or to positive voltage supplies which are connected through switches 710 and 720 to the respective cores depending upon the manner in which the shift registers are to operate. Readout selector switch 730 selects one of the inputs from the output of one of the cores 301–318 for application to the input of output selector switch 750. Output selector switch 750 is provided with a further input by the output of the last stage 318 of shift register 320. The cores comprising shift register 360 are interconnected with feedback selector switch 720, modulo two adder 370 and readout selector switch 740 in the same fashion as the circuitry associated with shift register 320.

Switches 710 and 720 are standard rotary multipole, multilayer, multicontact, wafer switches. Such switches provide for economy of space while permitting a very large number of possible connections.

To insure foolproofness the lengths and feedback taps provided for the two feedback shift registers 320 and 360 should not be duplicated. Under the control of the feedback selector switches 710 and 720, the first two cores of the shift registers 320 and 360 may function as the first two stages of a conventional feedback shift register when the output of switches 710 or 720 is applied to the input winding of cores 301 and 341, respectively. On the other hand cores 301 and 341 may serve as one's generators and cores 302 and 342 as inverting stages. The shift registers 320 and 360 may be interconnected with the feedback selector switches 710 and 720 in accordance with the combinations listed in Table I:

TABLE I

| S.R. Stages | Output Maximal | Sequences Submaximal | Twin Feedback Taps for Maximal Sequences |
|---|---|---|---|
| 18 (normal) | 2 | 14 | 18-11; 18-7 |
| 17 (inverting) | 6 | — | 18-15; 18-13; 18-12; 18-4; 18-6; 18-7. |
| 17 (normal) | 6 | — | 17-14; 17-12; 17-11; 17-3; 17-5; 17-6. |
| 16 (normal) | NONE | 14 | NONE |
| 15 (inverting) | 8 | — | 16-15; 16-14; 16-12; 16-9; 16-2; 16-3; 16-5; 16-8. |
| 15 (normal) | 8 | — | 15-14; 15-13; 15-11; 15-8; 15-1; 15-2; 15-4; 15-7. |
| 11 (inverting) | 2 | — | 12-10; 12-3. |
| 11 (normal) | 2 | — | 11-9; 11-2. |
| 7 (inverting) | 4 | — | 8-7; 8-5; 8-4; 8-2. |
| 7 (normal) | 4 | — | 7-6; 7-4; 7-3; 7-1. |

For optimum connections, i.e., those wherein the length of the program is longest, between the feedback selector switches 710 and 720 and the cores in shift registers 320 and 360, the shift register 320 is connected to feedback selector switch 710 so that it is of seventeen, eleven, or seven stages of either inverting or normal operation, while shift register 360 is connected to feedback selector switch 720 so that it is connected as a normal eighteen stage shift register or a fifteen stage inverted or normal shift register. With this sequence it is possible to derive 432 different combinations of signals to output selector switch 750. If it is desired to provide one maximal and two sub-maximal sequences, shift register 320 may be selected to have seventeen or fifteen inverting or normal stages while shift register 360 may be selected to have eighteen normal stages with sixteen combinations or sixteen normal stages with twelve combinations. With this connection the total number of combinations is 784. For a slow speed intermittent duty device, the second system of 784 combinations is preferable. Very short output sequences are possible for the sub-maximal feedback taps but their probability is in direct proportion to their length.

Load selector switches, not shown, are included for loading the various stages of shift registers 320 and 360 with binary ones. The load selector switches include a further pair of rotary switches which are adapted to apply positive pulses to preload certain selected stages of shift registers 320 and 360 with binary ones so that the number of possible sequences may be increased. The load selector switches must be arranged so that neither of the shift registers 320 and 360 can be loaded with all zeros or ones.

The signal applied from the last stages of shift registers 320 and 360 and from selected stages of shift registers 320 and 360 via switches 730 and 740 are fed to any of the input leads to non-linear mixer 380 via output selector switch 750. Selector switch 750 is a further rotary selector switch which connects the input signals thereto in all combinations to its output leads. The signals applied to mixer 380 are combined in accordance with the Boolean algebra function $F = W\overline{X}\overline{Y}\overline{Z} + X\overline{Y} + Z\overline{W}$ where W, X, Y, and Z are the signals applied to it. As will be seen in connection with FIG. 3, this function may be generated by using only three magnetic cores and is sufficiently complex to effect acceptable security in a commercial privacy system with minimum hardware. For a more secure military system a different mixer of greater complexity may be employed.

The binary output signal on lead 396 of mixer 380 will not reoccur for approximately sixty days when the system is operating at sixty words per minute. This signal is applied to digital to analog converter 260. When the signal applied to terminal 296 is a binary "one", a positive analog voltage is produced at output terminal 299, while a negative output voltage is produced when the input at terminal 296 is a binary "zero". The program input pulses to terminals 296 and the timing pulses at terminal 294 occur during the same baud as the intelligence baud with which it is to correspond. The positive and negative pulses derived at terminal 299 of converter 260 are applied to terminal 199 in the manner previously described to effect operation of the mixer repeater 100.

Figure 3:
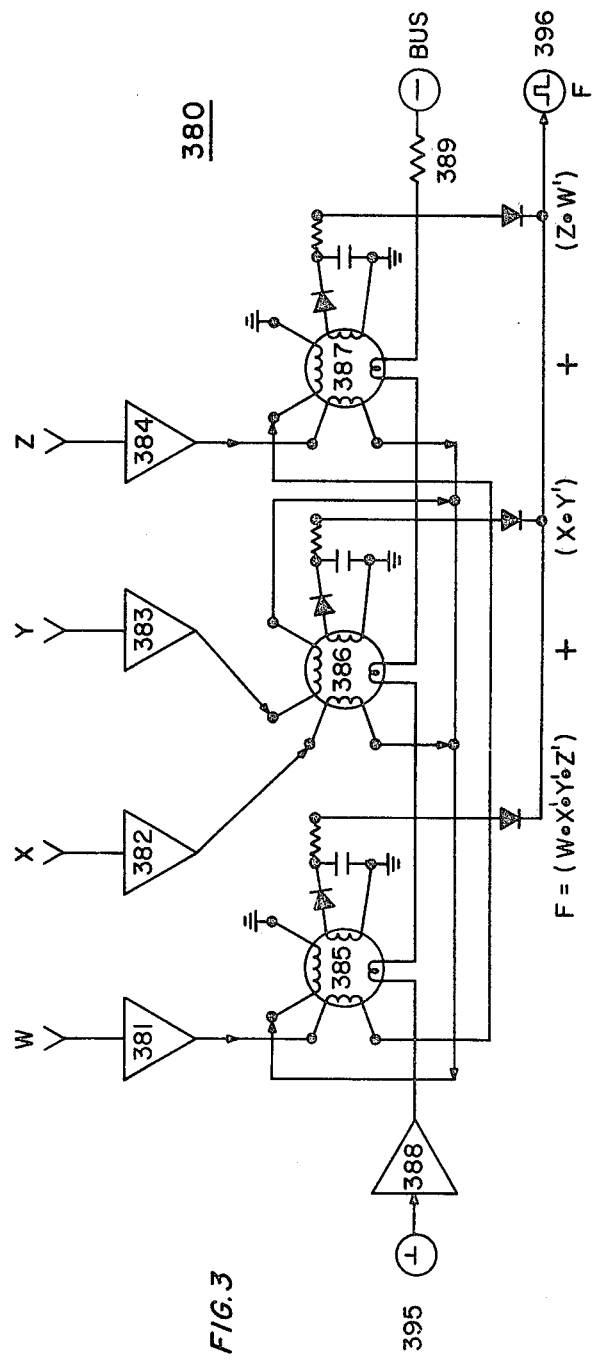
FIG. 3 is a circuit diagram of the output mixer utilized in FIG. 2.

Reference is now made to FIG. 3 of the drawings which discloses a preferred embodiment of the mixer 380. Driver amplifiers 381–384 are respectively responsive to the W, X, Y, and Z signals applied to the mixer from output selector switch 750. The mixer comprises three cores 385, 386, and 387 driven by advance pulses in synchronism with the timing pulses which are applied to terminal 395 and amplifier 388. Current limiting resistor 389 is connected in series with the advance winding and the negative power terminal.

The W input signal is coupled in series to the set winding of core 385 and the inhibit winding of core 387. The X input signal is coupled in series to the set winding of core 386 and the inhibit winding of core 385. The Y input signal is coupled in series to the inhibit windings of cores 386 and 385, while the Z input signal is coupled in series to the input winding of core 387 and the inhibit winding of core 385. The voltage outputs of cores 385, 386, and 387 are coupled through diodes 401, 402 and 403, respectively to output terminal 396 to form a logical OR gate.

The output voltage of core 385 is commensurate with the Boolean function $W \overline{X} \overline{Y} \overline{Z}$ because of the connections of W, X, Y and Z to its set and inhibit windings. The output voltage of core 386 is commensurate with the Boolean function $X \overline{Y}$ while the output voltage of core 387 equals $Z \overline{W}$. This non-linear function is represented in the following Table 2.

TABLE 2

$F = (W \overline{X} \overline{Y} \overline{Z}) \neq (X \overline{Y}) \neq (Z \overline{W})$
NONLINEAR OUTPUT MIXER TRUTH TABLE

| W | X | Y | Z | F |
|---|---|---|---|---|
| 0 | 1 | 0 | 0 | 0 |
| 0 | 0 | 0 | 1 | 1 |
| 0 | 0 | 1 | 0 | 0 |
| 0 | 0 | 1 | 1 | 1 |
| 0 | 1 | 0 | 0 | 1 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 0 |
| 1 | 0 | 1 | 0 | 0 |
| 1 | 0 | 1 | 1 | 0 |
| 1 | 1 | 0 | 0 | 1 |
| 1 | 1 | 0 | 1 | 1 |
| 1 | 1 | 1 | 0 | 0 |
| 1 | 1 | 1 | 1 | 0 |

This function has a fair degree of complexity and requires a minimum amount of hardware, utilizing only three cores and three diodes. While the apparatus utilized for generating the non-linear function requires little hardware, the function is quite appropriate for a commercial teletypewriter privacy system. This results from the 50% occurrence of zeros and ones. Because of the non-linear nature of the mixing function it is impossible to determine the inputs by knowledge of the outputs.

While I have described and illustrated one specific embodiment of my invention, it will be clear that variations of the details of construction which are specifically illustrated and described may be resorted to without departing from the true spirit and scope of the invention as defined in the appended claims.

I claim:

1. A teletypewriter privacy system comprising a first and a second pair of terminals responsive to printing-telegraphy signals having start bauds; means for generating program signals having a fixed timing relationship with the start bauds of said telegraphy signals; a mixer circuit coupled between said terminals, and responsive to said program signals; said mixer circuit including a first switch coupled to said first pair of terminals, and a second switch coupled to said second pair of terminals, means responsive to a start baud at said first pair of terminals for maintaining said first switch operative to couple said first pair of terminals to said mixer circuit for one telegraph character, means responsive to a start baud at said second pair of terminals for maintaining said second switch operative to couple said second pair of terminals to said mixer circuit for one telegraphy character, first polarized switch means responsive to the telegraphy signal at the first pair of terminals and the program signal for selectively activating said second switch, and second polarized switch means responsive to the telegraphy bauds at the second pair of terminals and the program signal for selectively activating said first switch.

2. The system of claim 1 further including means for generating a reset signal a predetermined time after the start baud is applied to one of said terminal pairs, a third polarized switch means coupled to both of said means for maintaining, said third polarized switch means including means for applying an activating potential to said means for maintaining, and means for applying said reset signal to said third polarized switch means to remove said activating potential from said means for maintaining.

3. The system of claim 1 wherein said first and second switches are separate relays having activating coils and circuits, each of said circuits having two input terminals and a common terminal, one of said coils being connected between a pair of said input terminals, and balancing resistances connected between each of said pair of input terminals and said common terminal.

4. The system of claim 1 including means for preventing more than one of said maintaining means from being activated at a time, wherein the first maintaining means activated is said one maintaining means.

5. A teletypewriter privacy system comprising a first and a second pair of input terminals responsive to telegraphy signals having start bauds; means for generating a program signal; a mixer connected between said terminals; said mixer comprising a line signal relay having contacts normally coupled between the first pair of terminals and the remainder of the mixer, a teletypewriter signal relay having contacts normally coupled between the second pair of terminals and the remainder of the mixer, a source of power, a line trigger relay, a teletypewriter trigger relay, a polarized bistable pulse control relay, a circuit reversing polarized bistable relay, a teletypewriter repeater relay, a line repeater relay, said line trigger relay having contacts for applying said source of power to energize said reversing relay into a receive state and said pulse control relay into an operate state in response to a start baud at said first terminals, said reversing and pulse control relays when energized into said states having contacts connected to said source of power for locking said line signal relay into its normal state, said teletypewriter trigger relay having contacts for applying said source of power to energize said reverse relay into a transmit state and said pulse control relay into an operate state in response to a start baud at said second terminals, said reverse and pulse control relays when energized into said last named states having contacts connected to said source of power for locking said teletypewriter signal relay into its normal state, means for energizing said line repeater relay in response to the bauds applied to said first pair of terminals, a control circuit responsive to said program signal for energizing said teletypewriter signal relay to a selective polarity, said control circuit including the contacts of said line repeater relay, means for energizing said teletypewriter repeater relay in response to the bauds applied to said second pair of terminals, and another control circuit responsive to said program signal for energizing said line signal relay to a selective polarity, said another control circuit including the contacts of said teletypewriter repeater relay.

6. The system of claim 5 including, a source of clock pulses started in response to the start baud, means for normally generating a reset signal after a predetermined number of clock pulses are generated, and means for coupling said reset signal to energize said pulse control relay in the opposite polarity from said operate state.

7. The system of claim 6 including means for at will changing the predetermined number of clock pulses by a single integer for one character during system operation.

8. The system of claim 7 wherein said means for changing increases said number.

9. The system of claim 7 wherein said means for changing decreases said number.

10. The system of claim 5 including a source of single value signals derived in response to said start baud and occuring at times coincident with the occurrence of five intelligence bauds in a character, and switch means for selectively coupling said single value and program signals to both of said control circuits.

11. The system of claim 5 wherein said means for generating includes a non-linear mixer.

12. The system of claim 11 wherein said non-linear mixer is responsive to four binary signals, W, X, Y, and Z, and said mixer includes means for generating an output signal representing $W\overline{X}\overline{Y}Z + X\overline{Y} + Z\overline{W}$.

13. The system of claim 12 wherein said mixer includes magnetic cores.

14. The system of claim 5 wherein said means for program generation includes a feed back shift register.

15. The system of claim 14 wherein said shift register includes means for selectively coupling a feed back signal to load the first stage of said shift register and to inhibit the second stage of said shift register.

16. The system of claim 5 wherein both of said trigger relays include means for suppressing the effect of short-duration spurious signals.

17. The system of claim 4 including an operate relay, a reversing relay, and means for momentarily delaying energization of said operate relay relative to energization of said reversing relay in response to a start baud.

18. The system of claim 4 wherein said means for generating a program signal includes a switch for selectively coupling fixed and coded program signals to said mixer, said switch being biased to normally couple said coded program to said mixer.

19. In combination, an electrical switching circuit for generating four pseudo-random binary electrical signals that correspond to W, X, Y and Z, and another electrical circuit for combining, through logical OR gates, said electrical signals to generate a further electrical signal representing $W\overline{X}\overline{Y}Z + X\overline{Y} + Z\,\overline{W}$, for use as a key for encoding a communication signal.

20. The combination of claim 19 wherein said logical OR gates include a plurality of magnetic cores.

21. In combination, means for generating four binary signals W, X, Y, and Z, and means for combining said signals to generate a signal representing $W\,\overline{X}\,\overline{Y}\,Z + X\,\overline{Y} + Z\,\overline{W}$, wherein said means for combining includes a plurality of magnetic cores, wherein said plurality equals three, each of said cores including a set and an inhibit winding, means for respectively coupling said W, X, and Z signals to the set windings of the first, second and third ones of said cores, means for coupling the X, Y, and Z signals to the inhibit winding of the first core, and means for coupling the Y and Z signals to the inhibit windings of the second and third cores, respectively.

* * * * *